US008769239B2

(12) United States Patent  (10) Patent No.: US 8,769,239 B2
Balkan et al.  (45) Date of Patent: Jul. 1, 2014

(54) RE-MAPPING MEMORY TRANSACTIONS

(75) Inventors: Deniz Balkan, Santa Clara, CA (US); Gurjeet S. Saund, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 761 days.

(21) Appl. No.: 12/971,985

(22) Filed: Dec. 17, 2010

(65) Prior Publication Data

US 2012/0159038 A1  Jun. 21, 2012

(51) Int. Cl.
*G06F 12/00* (2006.01)
(52) U.S. Cl.
USPC ............... 711/202; 711/5; 711/200; 711/201; 711/205; 710/9; 710/65; 710/66; 710/307
(58) Field of Classification Search
None
See application file for complete search history.

(56) References Cited

U.S. PATENT DOCUMENTS 6,718,444 B1 * 4/2004 Hughes .......................... 711/155
2012/0079138 A1 * 3/2012 Obkircher ....................... 710/15

OTHER PUBLICATIONS

ARM White Paper, "The ARM Cortex-A9 Processors," Document Revision 2.0, Sep. 2009, 11 pages.
ARM, "Cortex-A9 MPCore," Revision: r2p2, Technical Manual, Copyright 2008-2010, 168 pages.

* cited by examiner

*Primary Examiner* — Matthew Bradley
*Assistant Examiner* — Alan Otto
(74) *Attorney, Agent, or Firm* — Lawrence J. Merkel; Meyertons, Hood, Kivlin, Kowert & Goetzel, P.C.

(57) ABSTRACT

Systems and methods for re-mapping memory transactions are described. In an embodiment, a method includes receiving a memory request from a hardware subsystem to a memory, replacing a first identifier with a modified identifier in the memory request, and transmitting the memory request to the memory through a processor complex. The method further includes receiving a response from the memory, determining that the response corresponds to the memory request, replacing the modified identifier with the first identifier in the response, and transmitting the response to the hardware subsystem. In some embodiments, a system may be implemented as a system-on-a-chip (SoC). Devices suitable for using these systems include, for example, desktop and laptop computers, tablets, network appliances, mobile phones, personal digital assistants, e-book readers, televisions, and game consoles.

19 Claims, 5 Drawing Sheets

RE-MAPPING MEMORY TRANSACTIONS

BACKGROUND

1. Field of the Invention

This disclosure is related to the field of computer systems, and more particularly to systems and methods for re-mapping memory transactions.

2. Description of the Related Art

Some computers feature memory access mechanisms that allow hardware subsystems or input/output (I/O) peripherals to access system memory without direct interaction with a central processing unit (CPU) or processor. As a result, memory transactions involving these peripherals may take place while the processor continues to perform other tasks, thus increasing overall system efficiency. The use of such memory access mechanisms, however, also presents the so-called "coherency problem."

For example, in some situations, a processor may be equipped with a cache memory (e.g., L2 cache) and/or an external memory that may be accessed directly by peripherals. When the processor accesses a location in the external memory, its current value is stored in the cache. Ordinarily, subsequent operations upon that value would be stored in the cache but not in the external memory. Therefore, if a peripheral attempts to read the value from the external memory, it may receive an "old" or "stale" value. To avoid this situation, coherency may be maintained between values stored in cache and the external memory, such that cache values are copied to the external memory before the peripheral tries to access them.

Coherency techniques may be implemented via hardware or software. In the case of hardware, a control unit may receive a request from a peripheral and then perform one or more operations that attempt to ensure coherency between the cache and the external memory. Typically, a peripheral issues a memory request to the control unit, which in turn determines whether the request may be satisfied from cache. If the request cannot be satisfied from cache, then the control unit forwards the memory request to the external memory. The control unit may also arbitrate the return of a response from the external memory to the peripheral. In order for the system to keep track of which request and response were received from which originating peripheral, each such transaction may contain some type of identification information.

SUMMARY

This specification discloses systems and methods for mapping memory transactions. As such, systems and methods disclosed herein may be applied in various environments, including, for example, in computing devices that provide peripheral components with access to one or more memories. In some embodiments, systems and methods disclosed herein may be implemented in a system-on-a-chip (SoC) or application-specific integrated circuit (ASIC) such that several hardware and software components may be integrated within a single circuit. Examples of electronic devices suitable for using these systems and methods include, but are not limited to, desktop computers, laptop computers, tablets, network appliances, mobile phones, personal digital assistants (PDAs), e-book readers, televisions, video game consoles, etc.

In some embodiments, a method may include receiving a memory request issued from a hardware subsystem (e.g., a peripheral device or circuit) to a memory (e.g., a system memory), where the request includes a first identifier (e.g., a "transaction identifier"). The method may include replacing the first identifier with a modified identifier and transmitting the request with the modified identifier to the memory through a processor complex or other circuit. In some embodiments, the processor complex does not support memory requests having identifiers of a certain type and/or bit size. Accordingly, the method may select a modified identifier of a type and/or bit size which the processor complex is capable of properly processing. For example, the received memory request may have an 8-bit identifier, and the processor complex may only be able to handle 3-bit identifiers. In this case, the method may select a 3-bit identifier to replace the original 8-bit identifier. The method may also include storing a list correlating the original identifier with the modified identifier.

In other embodiments, the method may include receiving a response from the memory, where the response includes the modified identifier. The method may also include determining that the response corresponds to the memory request, replacing the modified identifier with the first identifier, and transmitting the response with the first identifier to the hardware subsystem. Determining that the response corresponds to the memory request may be performed, for example, by examining the stored list that correlates the modified identifier with the original identifier.

In certain embodiments, assigning a modified identifier to a memory request may be a function of the type of request. For example, if the memory request is a read or a write request, an identifier assignment mechanism may be used such that, for example, each of multiple requests originated from the same hardware subsystem, peripheral, or input stream receives a different modified identifier. Additionally or alternatively, if the memory request is a write request, another technique may be used such that each request from the same hardware subsystem, peripheral, or input stream is assigned the same modified identifier.

In some embodiments, a system-on-chip (SoC) may include a memory, a processor complex coupled to the memory, and an interface circuit coupled to the processor complex and configured to: receive a request from a peripheral, replace a first identifier within the request with a modified identifier, and transmit the request to the processor complex. The interface circuit may be also configured to: receive a response corresponding to the request, replace the modified identifier within the response with the first identifier, and transmit the response to the peripheral.

In yet other embodiments, a logic circuit may include a re-mapper circuit that is configured to receive a request from a first circuit to access a memory, where the memory is accessible through a second circuit, the request has a first identifier, the first identifier has a first bit size, and the second circuit does not support requests having identifiers of the first bit size. The re-mapper circuit may also be configured to replace the first identifier within the request with a second identifier, where the second identifier has a second bit size, the second circuit supports requests having identifiers of the second bit size, and the second bit size is smaller than the first bit size. The re-mapper circuit may be further configured to transmit the request to the memory through the second circuit. In addition, the logic circuit may include one or more programmable registers coupled to the re-mapper circuit and configured to enable an operation of the re-mapper circuit.

BRIEF DESCRIPTION OF THE DRAWINGS

The following detailed description makes reference to the accompanying drawings, which are now briefly described.

Figure 1:
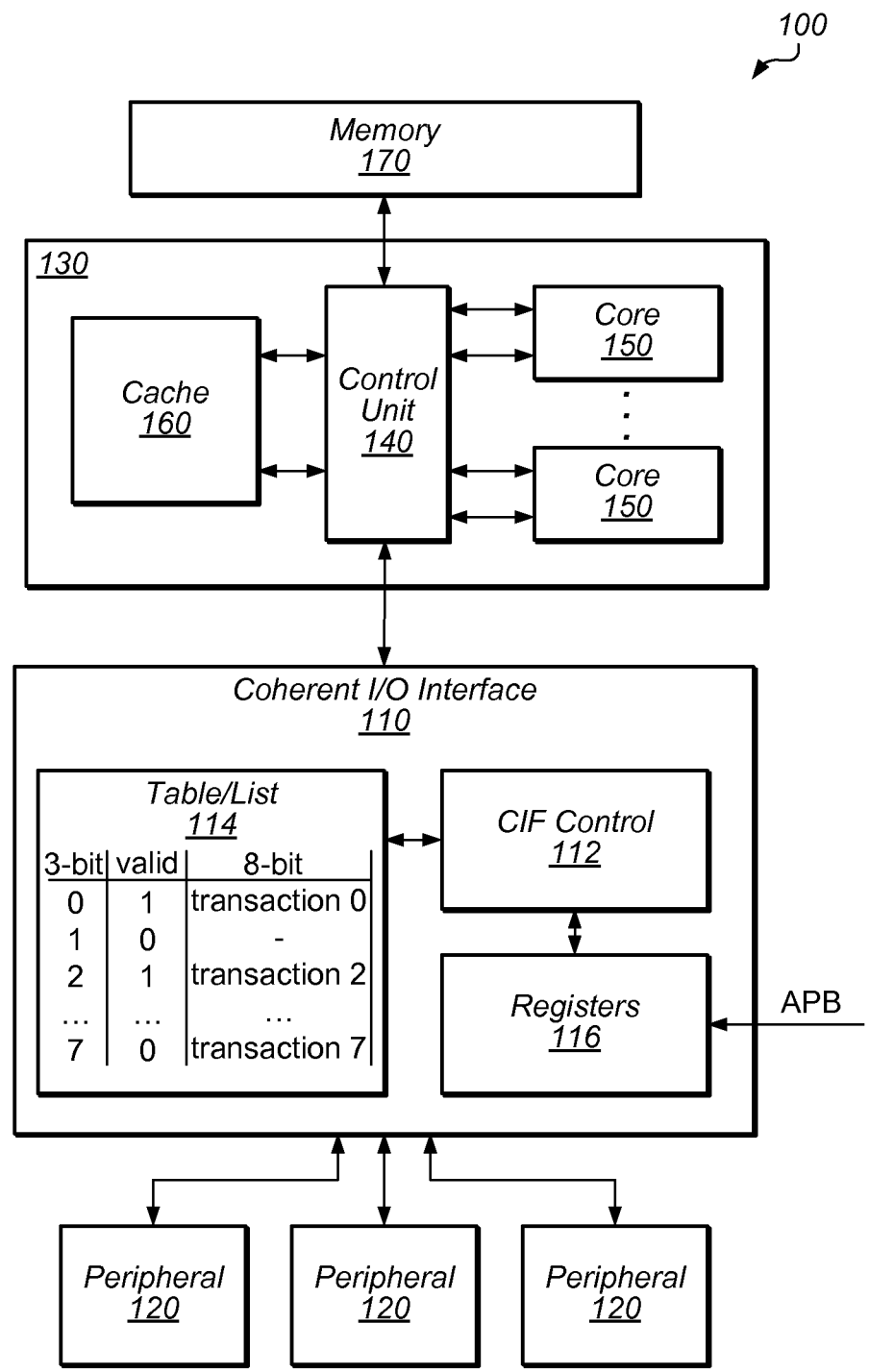
FIG. 1 is a block diagram of a SoC according to certain embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, ¶6 interpretation for that unit/circuit/component.

DETAILED DESCRIPTION OF EMBODIMENTS

In some embodiments, at least one processor core and/or cache may be placed within a processor fabric or complex, and the processor complex may be coupled to a system memory. The processor complex may also include other components such as, for example, a coherency or control circuit. The control circuit may enable hardware subsystems and/or peripherals to access the system memory while maintaining coherency between the cache and the system memory. In operation, a memory request originating from a peripheral may be processed by a coherent input/output (I/O) interface (CIF) of a central direct memory access (CDMA) controller and sent by the CIF to the control circuit within the processor complex. In some embodiments, the CIF may perform re-mapping operations that modify identification information contained in the request, as well as in its respective response.

Turning to FIG. 1, a block diagram of a system-on-chip (SoC) is depicted according to certain embodiments. As illustrated, processor complex 130 includes cache 160, which represents a cache memory (e.g., L2 cache) and cache controller. Processor complex 130 also includes a plurality of processor cores 150 coupled to control unit 140. In some embodiments, each of processor cores 150 may have its own cache (e.g., L1 cache). Control unit 140 may connect processor cores 150 to shared, external, or any other type of memory 170 (e.g., RAM). Furthermore, control unit 140 may be configured to maintain data cache coherency among processor cores 150 and/or to manage accesses by external devices such as peripherals and hardware subsystems.

Processor complex 130 is coupled to coherent input/output (I/O) interface (CIF) 110. As illustrated, one or more peripherals 120 are coupled to CIF 110. In some embodiments, CIF 110 may be part of a central direct memory access (CDMA) controller or the like. Additionally or alternatively, CIF 110 may be a coherency bridge or any other suitable type of interface circuit that implements a memory access mechanism. Peripherals 120 may include any device, hardware subsystem, or circuit configured to or capable of interacting with processor complex 130 and/or memory 170. Examples of peripherals 120 include audio controllers, video or graphics controllers, interface (e.g., universal serial bus or USB) controllers, etc.

In some embodiments any number and/or types of cores, caches, and control units may be used. Furthermore, a number of additional logic components (not shown) may be part of processor complex 130 such as, for example, buffers, registers, clocks, synchronizers, logic matrices, decoders, interfaces, etc. In some cases, any number of peripherals, interfaces, logic circuits, processor complexes, memories and other elements may be discrete, separate components. In other cases, these and other elements may be integrated, for example, an application-specific integrated circuit (ASIC), etc.

Components shown within SoC 100 may be coupled to each other using any suitable bus and/or interface mechanism. In some embodiments, these components may be connected using ARM Holdings' Advanced Microcontroller Bus Architecture (AMBA®) protocol or any other suitable on-chip interconnect specification for the connection and management of logic blocks. Examples of AMBA® buses and/or interfaces may include Advanced eXtensible Interface (AXI), Advanced High-performance Bus (AHB), Advanced System Bus (ASB), Advanced Peripheral Bus (APB), Advanced Trace Bus (ATB), etc.

In operation, peripherals 120 may have access to memory 170 through CIF 110 and through processor complex 130. For example, an originating one of peripherals 120 may issue a read or a write request to memory 170. CIF 110 may then receive the request, perform one or more transaction re-mapping operations, and forward the request or transaction to processor complex 130. Control unit 140 may provide a mechanism for coherent I/O traffic to snoop cache 160. If there is "cache hit" (i.e., the request can be satisfied with cache 160), control unit 140 provides a response to CIF 110. On the other hand, if there's a "cache miss" (i.e., the request cannot be satisfied with cache 160), control unit 140 forwards the request to memory 170 which, upon satisfying the request, returns a response to control unit 140.

The response is then forwarded from control unit 140 to CIF 110. CIF 110 may receive the response, again perform one or more transaction re-mapping operations, and forward the response to the originating one of peripherals 120. Accordingly, in some embodiments, the "memory request" is not limited to requests that are ultimately responded to by memory 170, but can also include requests that are satisfied by cache 160 or any other memory in the memory hierarchy (e.g., L1 or L3 cache).

In some embodiments, to perform its various re-mapping operations, CIF 110 may include CIF control circuit 112 coupled to an identifier table or list 114 and to one or more registers 116. Registers 116 may be accessible via an APB interface or the like, and may store settings used by CIF control circuit 112 to implement particular functions and/or to enter specified modes of operation. Based on these settings, CIF control circuit 112 may build and maintain table or list 114 in any suitable fashion. In one example, table 114 is indexed by "modified identifier" (e.g., a 3-bit identifier indicated in the left column). A "valid" column indicates whether the particular modified identifier is in use or "in flight"—i.e., whether it is presently being used in connection with an outstanding request or transaction. The right-hand column indicates the peripheral transaction (e.g., an 8-bit identifier) whose original identifier has been replaced by, or re-mapped to, the corresponding modified identifier. The operation of these various elements is discussed in more detail below with respect to FIGS. 2 and 3.

In some embodiments, CIF 110 may be a programmable logic circuit or the like. As such, CIF 110 may comprise standard electronic components such as bipolar junction transistors (BJTs), field-effect transistors (FETs), other types of transistors, logic gates, operational amplifiers (op amps), flip-flops, capacitors, diodes, resistors, and the like. These and other components may be arranged in a variety of ways and configured to perform the various operations described herein.

Figure 2:
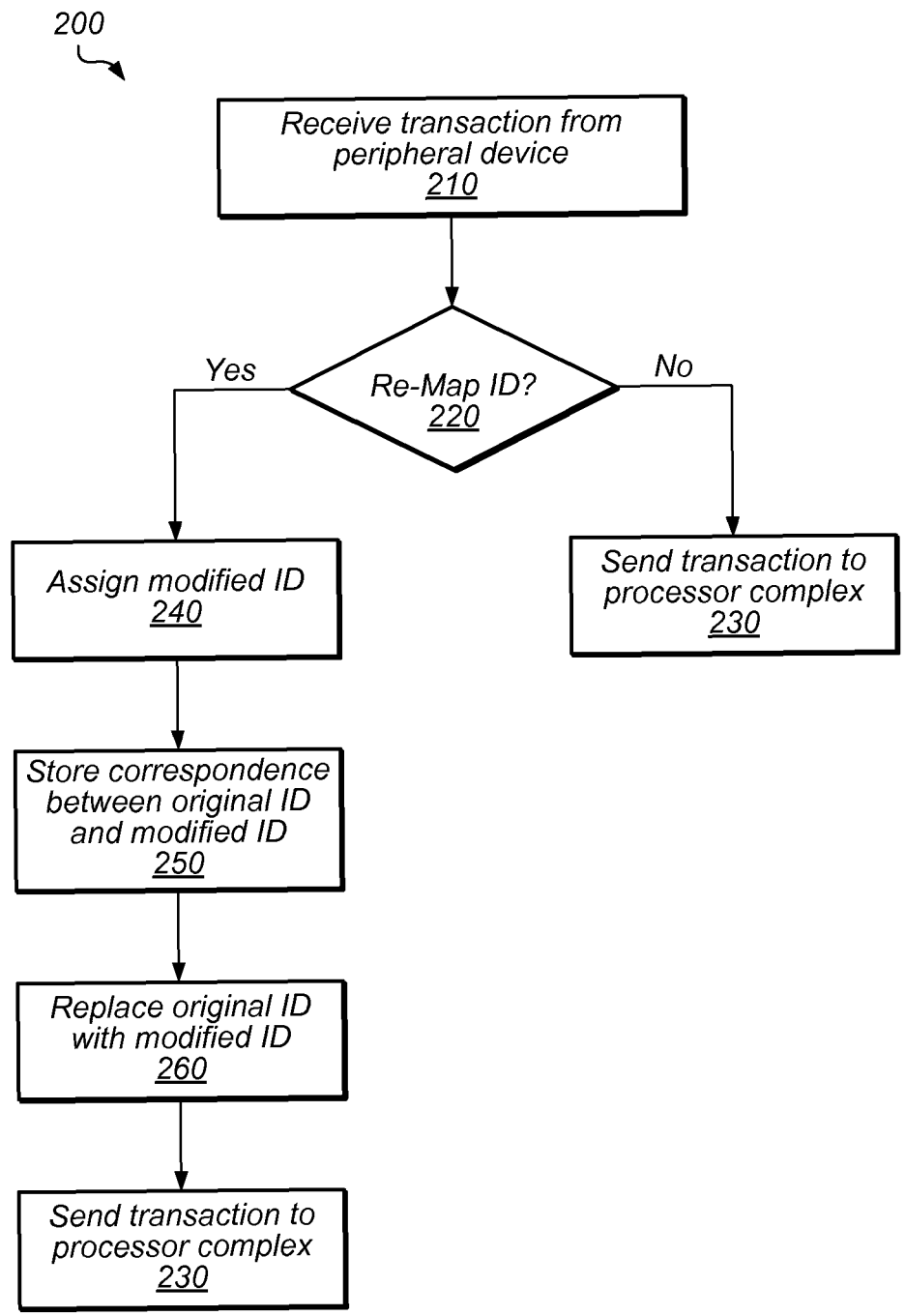
FIG. 2 is a flowchart of a method for re-mapping requests according to certain embodiments.

Referring now to FIG. 2, a flowchart of a method for re-mapping requests is depicted according to certain embodiments. Method 200 may be performed, for example, when CIF 110 (in FIG. 1) forwards a request from one of peripherals 120 to memory 170 and/or processor complex 130. At 210, CIF control circuit 112 receives a request or transaction (e.g., a memory request) from a hardware subsystem, peripheral device 120, or some other request originating circuit. As received, the request may include a first or original transaction identifier. At 220, CIF control circuit 112 optionally determines whether a transaction identifier re-mapping operation has been set or otherwise enabled. This may be performed, for instance, by examining one or more of registers 116 in FIG. 1, which may have been programmed by a user. If not, CIF control circuit 112 transmits the original request or transaction to processor complex 130 at 230. Otherwise, CIF control circuit 112 assigns a modified identifier to the original request at 240.

In some embodiments, CIF control circuit 112 may implement "1:1" or "1:many" mapping techniques at 240. In "1:many" mapping, each request may be assigned a different identifier, regardless of source. In contrast, in "1:1" mapping, requests from the same peripheral 120 or input stream may receive the same identifier. In some embodiments, 1:many mapping is generally faster insofar as the unique mapping between a request and its respective response may be readily discerned without concern for ordering. Whereas 1:1 mapping may allow a larger number of requests to be processed (to the extent that a lesser number of unique modified identifiers is in use at a given time), associating a response with its corresponding request typically involves resolving the order of such requests. In some embodiments, CIF control circuit 112 may select between different mapping mechanisms based on settings stored in registers 116. In other embodiments, CIF control circuit 112 may dynamically select between 1:1 and 1:many mapping depending upon the number of active peripherals issuing requests at a given time. For instance, if few peripherals are active, 1:many mapping may be used. On the other hand, if many peripherals are active such that the number of outstanding requests approaches (or perhaps surpasses) the number of available unique identifiers (e.g., 11 requests in a system that only accepts 1-bit identifiers), 1:1 mapping may be used.

Additionally or alternatively, the type of identifier assignment mechanism used may be a function of the type of request received. In some cases, the system may process read requests differently from write requests. For example, if a system requires that the identifier for a read request be unique with respect to other outstanding read requests, then 1:many mapping may be used. On the other hand, if write requests are not so limited, either 1:1 or 1:many mapping may be applied. In this manner—and as described in the illustrative implementation discussed below—method 200 may be applied to situations where processor complex 130 may have differing requirements with respect to identifiers of differing types of requests.

At 250, CIF control circuit 112 stores or otherwise maintains a link or correspondence between the identifier in the request's original identifier and the modified identifier. This may be achieved, for example, using a look-up table, linked list, or the like (e.g., table or list 114). At 260, CIF control circuit 112 replaces the request's original identifier with the modified, newly assigned identifier. For example, the received request may have an 8-bit identifier, and processor complex 130 may only be able to handle 3-bit identifiers. In this case, method 200 may select a suitable, 3-bit modified identifier to replace the original, 8-bit identifier. For example, in order to select an available identifier, CIF control circuit 112 may check the status of a "valid" bit or flag in table or list 114. If a valid value is set to "0," this may indicate that the corresponding 3-bit address is available to be assigned. If the valid value is set to "1," this may indicate that the corresponding 3-bit address has already been assigned and is presently in used by another transaction; thus it is currently unavailable. Then, at 230, CIF control circuit 112 transmits the request with the modified identifier to processor complex 130. Although operations 210-260 are shown in FIG. 2 in a particular order, method 200 is not limited to this order. For example, an alternative embodiment may include replacing original transaction (at 260) prior to storing a correspondence (at 250), etc.

Figure 3:
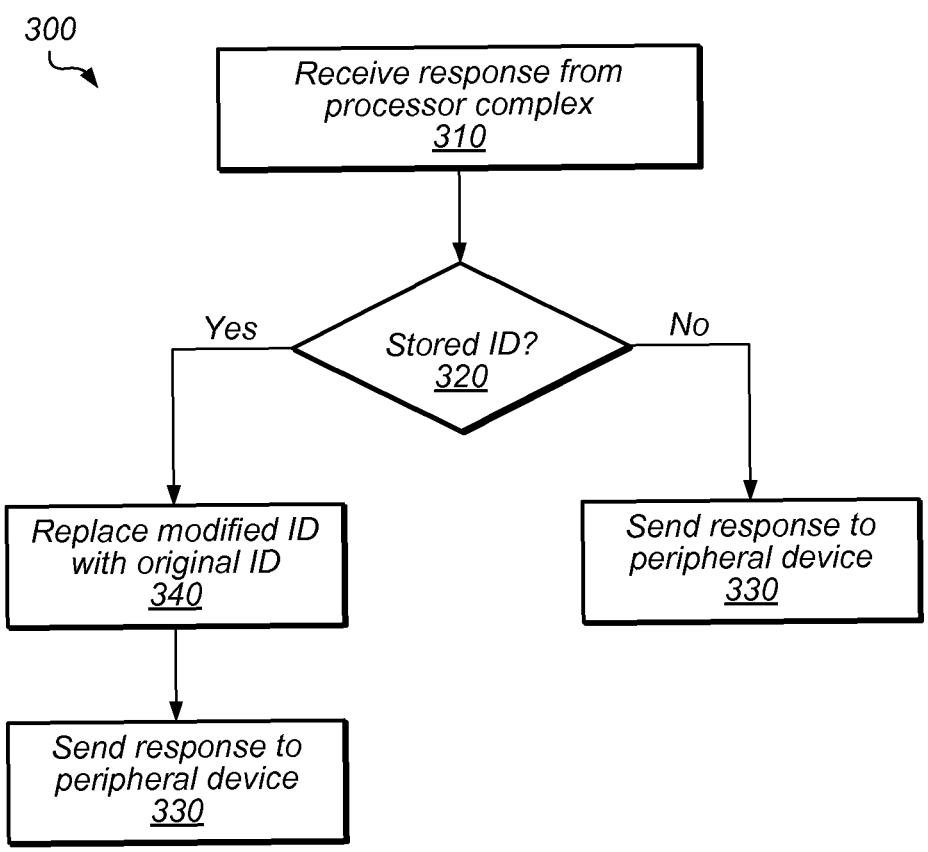
FIG. 3 is a flowchart of a method for re-mapping responses according to certain embodiments.

Referring to FIG. 3, a flowchart of a method for re-mapping responses is depicted according to certain embodiments. Method 300 may be performed, for example, when CIF control circuit 112 forwards a response from memory 170 and/or processor complex 130 to one of peripheral devices 120. At 310, CIF control circuit 112 receives a response from processor complex 130. In some embodiments, method 300 may be indifferent as to whether the response results the request being satisfied by memory 170, cache 160, or any other memory in a memory hierarchy. At 320, CIF control circuit 112 optionally determines whether the identifier in the response matches an identifier that has been stored, for example, at 250 of method 200 (in FIG. 2). In some embodiments, this determination may be performed by comparing the modified identifier within the response to identifiers stored or indexed in table or list 114 to search for a match. If there is no match (or if there is a match but the "valid" value for that entry is "1;" which indicates that the entry is stale or invalid), then the response is transmitted to the request originating device or circuit (e.g., one of peripherals 120). If there is a match and if the "valid" value for that entry or row is "0," CIF control circuit 112 determines the original identifier corresponding to the identifier of received in the response and replaces it with such original identifier at 340 prior to sending the response (with the original identifier) back to the originating device or circuit at 330.

An Illustrative Implementation

This section discusses an illustrative, non-limiting implementation of systems and methods described herein. This implementation includes one or more of ARM Holdings' Cortex™-A9 processors (processor cores 150) and an SCU (control unit 140) that does not support long transaction identifiers within memory requests. Specifically, the advanced coherency port (ACP) port of the SCU can only process request 3-bit AXIDs (transaction identifiers); that is, identifiers that are 3-bits long. However, identifiers are ordinarily generated by peripheral device 120 or other circuit with more than 3-bits. Further, downstream processing of these requests (e.g., by a CDMA or multiplexing circuit that receives multiple requests from multiple peripherals) may add even more bits to the original identifiers. As a result, by the time a request arrives at CIF 110, it may be 8-bits long (or longer). Accordingly, CIF 110 may implement systems and methods described herein to re-map long AXID identifiers into short AXID identifiers.

Figure 4:
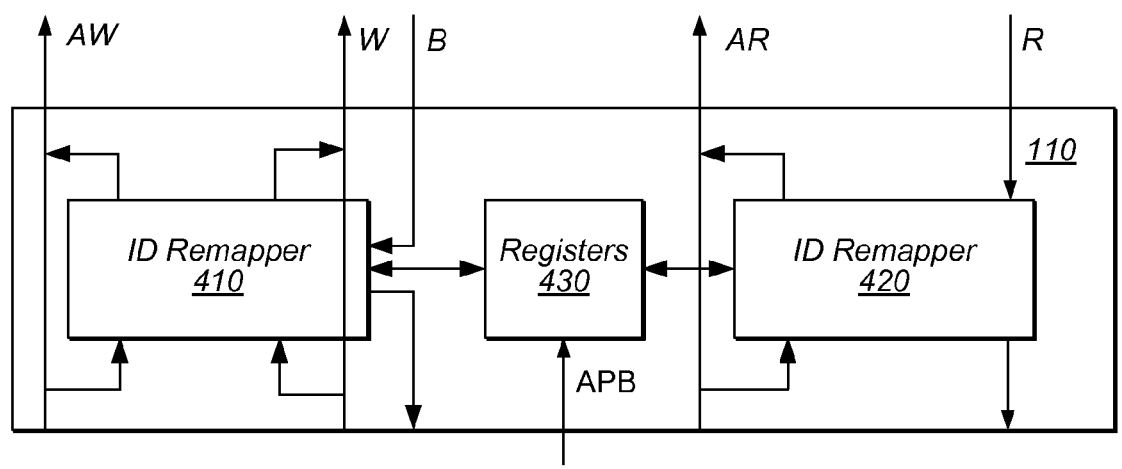
FIG. 4 is a block diagram of an illustrative, non-limiting implementation of various systems and methods described herein according to certain embodiments.

Turning now to FIG. 4, a block diagram of an implementation of various systems and methods described herein according to certain embodiments. As shown, CIF 110 is implemented in an AMBA® AXI bus. Accordingly, CIF 110 includes two identifier (ID) re-mapper circuits 410 and 420, one for each channel (read and write) of the AXI bus. CIF 110 also includes one or more programmable registers 430 that may be configured to perform a number of functions as described below. The ports or lines of CIF 110 include "AR" (e.g., read address and AXID) and "AW" (e.g., write address and AXID) which propagate QoS information so that it may bypass the processor complex 140. These ports also include "R" (e.g., read data, AXID, and read response), "W" (e.g., write data), and "B" (e.g., write response).

As noted above, in this implementation, the advanced coherency port (ACP) port of SCU can only process AXIDs that are 3-bits long, whereas request identifiers arriving at CIF 110 may be 9-bits long—i.e., 9-bit AXIDs. Processor complex 140 has the additional requirement that no two (or more) read requests with the same transaction identifier should be outstanding at any time—although write requests are not subject to this restriction.

Accordingly, in this case CIF 110 is configured to map a 9-bit AXID into a 3-bit AXID. Moreover, to accommodate the distinction between read and write requests, re-mapper circuit 420 implements a 1:1 AXID assignment (i.e., for read requests) while re-mapper circuit 410 implements a 1:many AXID assignment (i.e., for write requests). In alternative implementations, however, re-mapper circuit 410 may also implement a 1:1 assignment.

To keep track of the correspondence between a 9-bit AXID (i.e., the original or first transaction identifier) and a 3-bit AXID (i.e., the modified or newly assigned transaction identifier), CIF 110 may maintain a re-order buffer, linked-list, or look-up table that orders pairs of 9-bit and 3-bit AXIDs, for example, from oldest (e.g., head of the linked list) to youngest (e.g., tail of linked list). Furthermore, if write data is associated with an incoming request, the write data may only allowed to move forward after the associated request has been stored in the buffer, thus assuring that the request and write data are both associated with the same 3-bit AXID. Also, when response data for a transaction is received, it may be immediately forwarded to the originating peripheral 120 if it is associated with the oldest transaction in its stream and there is no pending data ready to be issued from CIF 110.

On the other hand, if a particular response does not correspond to the oldest entry for a particular original (9-bit) ID, then the response may be stored until all other responses older than this particular response are sent out. Only then may the particular response be sent out. This may be necessary in some embodiments because, for example, AXI requires that responses be sent in order of transactions. It should be noted that, in these cases, mapping original 9-bit ID transactions to different 3-bit IDs may cause the order of responses to be lost (because responses for different IDs do not necessarily return in order). To address such cases, responses for a particular original 9-bit ID may be placed back in order using the re-order buffer.

In some implementations, programmable registers 430 may be provided to allow a user to enable identifier re-mapping functionality by CIF 110. For example, programmable registers 430 may be accessible via an APB interface or the like. In addition, certain processor complex 140 implementations may only allow a certain number of outstanding transactions at a given time, and those may vary on a channel-by-channel or line basis (e.g., the read channel may allow 13 transactions "in flight," whereas the write channel may allow only 5 transactions in flight). Moreover, the size of an acceptable AXID may also vary among different processor complexes. Thus, in some embodiments, programmable registers 430 may allow a user to set the maximum number of transactions that can be re-mapped per channel, and the size of modified AXID identifiers.

A Computer System and Storage Medium

Figure 5:
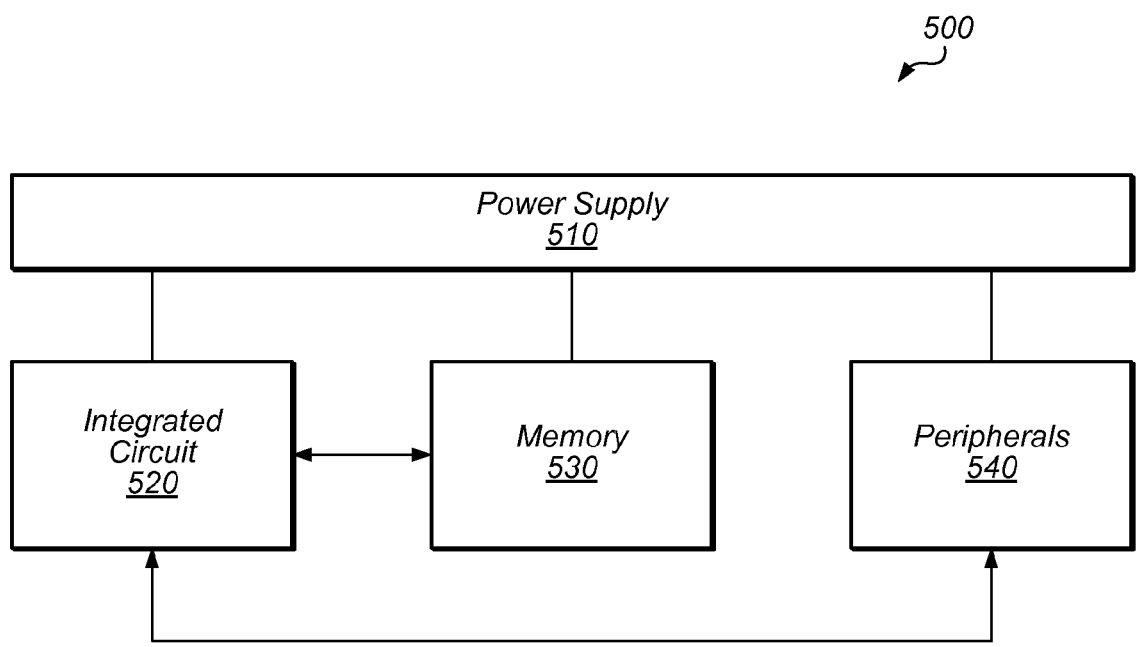
FIG. 5 is a block diagram of a computer system according to certain embodiments.

In some embodiments, a computer and accessible storage medium may incorporate embodiments of the systems and methods described herein. Turning next to FIG. 5, a block diagram of such system is shown. As illustrated, system 500 includes at least one instance of integrated circuit 520. Integrated circuit 520 may include one or more instances of CIF 110 and processor complex 130 (of FIG. 1). In some embodiments, integrated circuit 520 may be a system-on-chip (SoC) or application specific integrated circuit (ASIC) including one or more instances of CIF 110, processor complex 130, and various other circuitry such as memory controllers, video and/or audio processing circuitries, on-chip peripherals and/or peripheral interfaces to couple to off-chip peripherals, etc. Integrated circuit 520 is coupled to one or more peripherals 540 (e.g., peripherals 120) and external memory 530 (e.g., memory 170). Power supply 510 is also provided which supplies the supply voltages to integrated circuit 520 as well as one or more supply voltages to memory 530 and/or peripherals 540. In some embodiments, more than one instance of the integrated circuit 520 may be included (and more than one external memory 530 may be included as well).

Peripherals 540 may include any desired circuitry, depending on the type of system 500. For example, in an embodiment, system 500 may be a mobile device (e.g., personal digital assistant (PDA), smart phone, etc.) and peripherals 540 may include devices for various types of wireless communication, such as Wi-fi, Bluetooth, cellular, global positioning system, etc. Peripherals 540 may also include additional storage, including RAM storage, solid state storage, or disk storage. Peripherals 540 may include user interface devices such as a display screen, including touch display screens or multitouch display screens, keyboard or other input devices, microphones, speakers, etc. In other embodiments, system 500 may be any type of computing system (e.g., desktop and laptop computers, tablets, network appliances, mobile phones, personal digital assistants, e-book readers, televisions, and game consoles).

External memory 530 may include any type of memory. For example, external memory 530 may include SRAM, non-volatile RAM (NVRAM, such as "flash" memory), and/or dynamic RAM (DRAM) such as synchronous DRAM (SDRAM), double data rate (DDR, DDR2, DDR3, etc.) SDRAM, RAMBUS DRAM, etc. External memory 530 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

The invention claimed is:

1. A method comprising:
    receiving a memory request from a hardware subsystem to a memory, wherein the memory request includes a first identifier;
    replacing the first identifier with a modified identifier selected from a plurality of modified identifiers that are available to assign to memory requests, wherein the modified identifier is selected responsive to receiving the memory request;
    transmitting the memory request with the modified identifier to the memory through a processor complex;
    in response to transmitting the memory request, receiving a response from the memory, wherein the response includes the modified identifier;
    determining that the response corresponds to the memory request based, at least in part, on the modified identifier;
    replacing the modified identifier with the first identifier;
    transmitting the response with the first identifier to the hardware subsystem;
    preventing selection of the modified identifier for a subsequently-received memory request prior to transmitting the response to the hardware subsystem; and
    releasing the modified identifier to be used for another memory request responsive to transmitting the response to the hardware subsystem.

2. The method of claim 1, wherein the modified identifier has fewer bits than the first identifier.

3. The method of claim 2, wherein the modified identifier has less than half of a number of bits of the first identifier.

4. The method of claim 1, wherein the memory request is a read request, and wherein replacing the first identifier with the modified identifier comprises mapping the first identifier to an identifier that is not in use by another read request.

5. The method of claim 4, wherein replacing the first identifier with the modified identifier comprises mapping the first identifier to an identifier that is not in use by any other outstanding read requests.

6. The method of claim 1, wherein the memory request is a write request, and wherein replacing the first identifier with the modified identifier comprises mapping the first identifier to an identifier corresponding to the hardware subsystem.

7. The method of claim 6, further comprising:
    prior to receiving the response, receiving another memory request from the hardware subsystem to the memory, wherein the another memory request is another write request and includes a second identifier; and
    replacing the second identifier with the modified identifier.

8. The method of claim 1, wherein determining that the response corresponds to the memory request comprises determining an order of receipt of the write request with respect to other write requests from the hardware subsystem.

9. The method of claim 1, wherein the memory request is a write request, and wherein replacing the original identifier with the modified identifier comprises mapping the original identifier to an identifier that is not in use by any other outstanding write requests.

10. The method of claim 1, further comprising storing a list correlating the original identifier with the modified identifier.

11. The method of claim 10, wherein replacing the modified request identifier with the first request identifier in the response further comprises:
    finding the modified identifier in the list;
    selecting the first identifier from the list, wherein the modified identifier corresponds to the first identifier; and
    inserting the first identifier into the response.

12. The method of claim 1, further comprising, prior to replacing the first identifier with a modified identifier in the memory request, determining that an identification re-mapping operation has been set.

13. A system-on-chip (SoC) comprising:
    a memory;
    a processor complex coupled to the memory; and
    an interface circuit coupled to the processor complex, wherein the interface circuit is configured to:
        receive a request from a peripheral;
        replace a first identifier within the request with a modified identifier, wherein the modified identifier is smaller than the first identifier and is selected from a plurality of modified identifiers that are available to assign to memory requests, wherein the modified identifier is selected responsive to receiving the memory request;
        transmit the request to the processor complex;
        receive a response corresponding to the request;
        replace the modified identifier within the response with the first identifier;
        transmit the response to the peripheral;
        prevent selection of the modified identifier for a subsequently-received request prior to transmitting the response to the peripheral; and
        release the modified identifier to be used for another memory request responsive to transmitting the response to the peripheral.

14. The SoC of claim 13, wherein the request is a memory request from the peripheral to the memory.

15. The SoC of claim 14, wherein:
    in response to the memory request being a read request and prior to replacing the first identifier within the read request, selecting a modified identifier that is not in use by any other read request; and
    in response to the memory request being a write request and prior to replacing the first identifier within the write request, selecting a modified identifier that is assigned to the peripheral.

16. The SoC of claim 13, further comprising, prior to replacing the first identifier within the request, selecting a modified identifier that is not in use by another request.

17. A logic circuit comprising:
    a re-mapper circuit configured to:
        receive a request from a first circuit to access a memory, wherein the memory is accessible through a second circuit, the request has a first identifier, the first identifier has a first bit size, and the second circuit does not support requests having identifiers of the first bit size;
        replace the first identifier within the request with a second identifier, wherein the second identifier has a second bit size, the second circuit supports requests having identifiers of the second bit size, and the second bit size is smaller than the first bit size, and the second identifier selected from a plurality of identifiers responsive to receiving the request, wherein the plurality of identifiers are available to assign to requests;

transmit the request to the memory through the second circuit;

receive a response corresponding to the request, wherein the response includes the second identifier;

replace the second identifier within the response with the first identifier;

transmit the response to the first circuit;

prevent selection of the second identifier for a subsequently-received request prior to transmitting the response to the first circuit; and release the second identifier to be used for another request responsive to transmitting the response to the first circuit; and one or more programmable registers coupled to the re-mapper circuit and configured to enable an operation of the re-mapper circuit.

18. The logic circuit of claim 17, wherein the one or more programmable registers are further configured to specify the second bit size.

19. The logic circuit of claim 17, further comprising a buffer coupled to the re-mapping circuit and configured to store a mapping between the first identifier and the second identifier.

* * * * *